Figure 1:
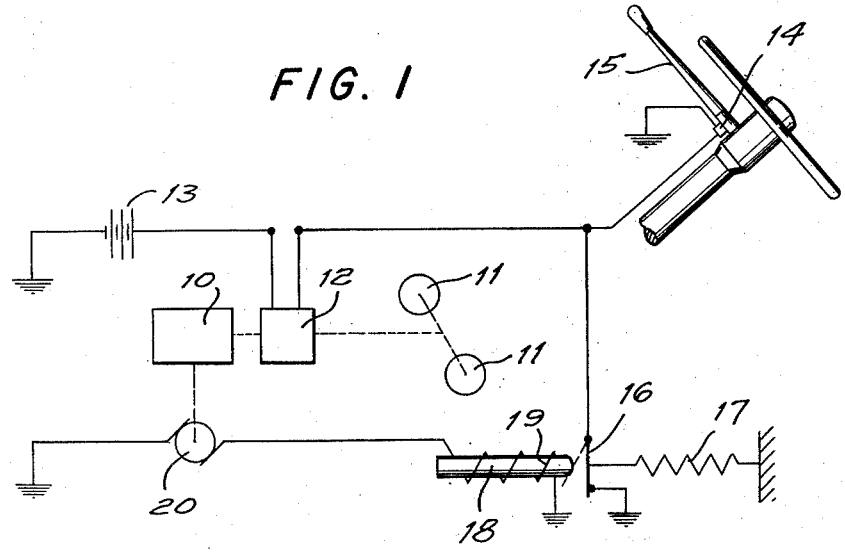

Feb. 18, 1958

R. BINDER 2,823,778

AUTOMATIC CLUTCH ARRANGEMENT

Filed July 30, 1956

2 Sheets-Sheet 1

INVENTOR:
Richard Binder
BY: Michael S. Striker
Agt.

Feb. 18, 1958    R. BINDER    2,823,778
AUTOMATIC CLUTCH ARRANGEMENT
Filed July 30, 1956    2 Sheets-Sheet 2
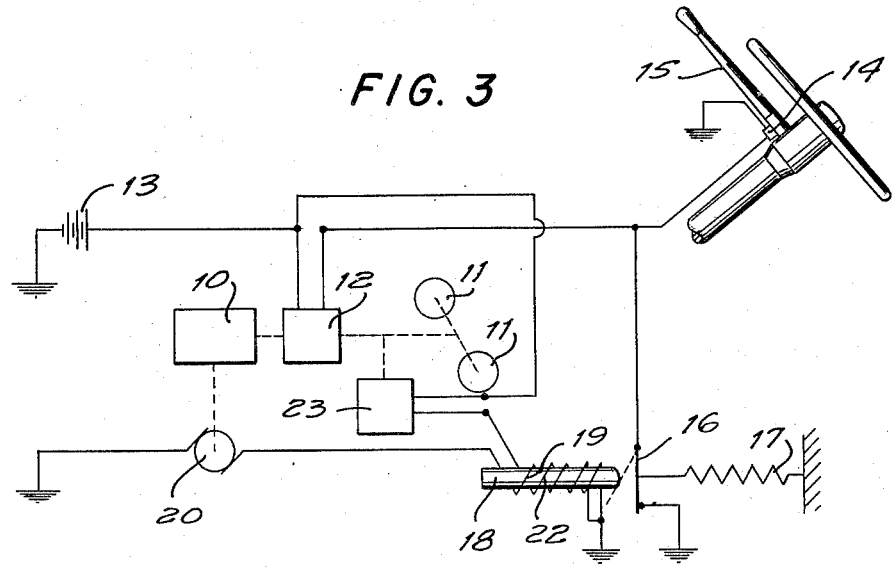
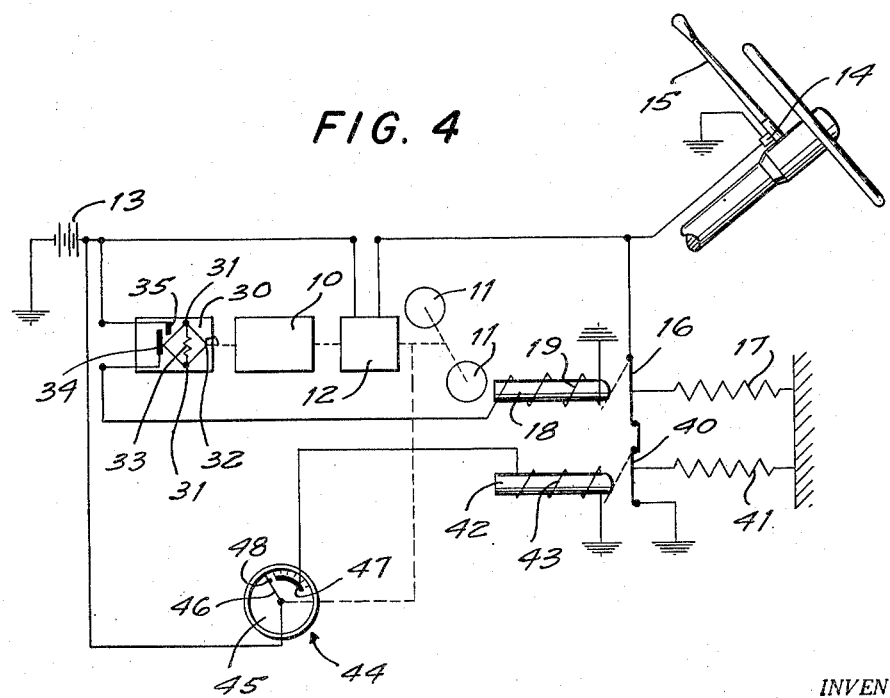
INVENTOR:
Richard Binder
BY: Michael S. Striker
Agt.

United States Patent Office 2,823,778
Patented Feb. 18, 1958

2,823,778
AUTOMATIC CLUTCH ARRANGEMENT

Richard Binder, Schweinfurt am Main, Germany, assignor to Fichtel & Sachs A. G., Schweinfurt am Main, Germany Application July 30, 1956, Serial No. 600,923

Claims priority, application Germany July 30, 1955

6 Claims. (Cl. 192—103)

The present invention relates to an automatic clutch arrangement.

More particularly, the present invention relates to an automatic clutch arrangement wherein a clutch which interconnects the engine and driving wheels of a motor vehicle is automatically disengaged when the rotational speed of the engine is relatively low, that is, when the engine which is normally of the internal combustion type rotates at or near idling speed or below. As a result, when the vehicle is at a standstill, it will not tend to creep forward under the influence of the slowly rotating engine, nor is there any danger of over-heating of the engine as often occurs in automatic transmission arrangements wherein no provision is made for automatically disconnecting the driving wheel from the engine when the vehicle is at a standstill.

While, for the reasons set forth above, it is desirable automatically to disconnect the engine and the driving wheels of the vehicle while the same is at a standstill with the engine rotating at idling speed, the automatic clutch arrangement preferably should be so constructed that the clutch is automatically engaged when the vehicle begins to move, i. e., when the linear speed of the vehicle exceeds a predetermined speed. This coupling action should take place irrespective of the rotational speed of the engine, for otherwise when the vehicle, particularly if it is heading downhill, may commence to coast, i. e., attain a relatively high speed at a time when the driving wheels are disconnected from the engine, if the engine for some reason or other has stalled or is otherwise not accelerated by the driver. Also, if it were not for an arrangement whereby the engine and driving wheels are power-transmittingly connected to each irrespective of the rotational speed of the engine when the linear speed of the vehicle attains a certain value, it would not be possible to crank the engine by pushing the vehicle or permitting the same to roll, as sometimes is necessary.

It is therefore an object of the present invention to provide an automatic clutch arrangement capable of automatically uncoupling the engine and driving wheels of a motor vehicle whenever the rotational speed of the engine is below a predetermined rotational speed.

It is another object of the present invention to provide an automatic clutch arrangement which while capable of automatically uncoupling the engine and driving wheels of a motor vehicle whenever the rotational speed of the engine is below a predetermined rotational speed, is capable of coupling the engine and the driving wheels when the vehicle reaches or travels at a linear speed which is at least as great as a predetermined linear speed.

It is yet another object of the present invention to provide an automatic clutch arrangement which comprises a minimum number of individual elements and which may be built and installed at very low cost.

With the above objects in view, the present invention mainly consists in an automatic clutch arrangement for use in a motor vehicle having at least one driving wheel and an engine for driving the same. The automatic clutch arrangement includes clutch means interconnecting the engine and the driving wheel for power-transmittingly coupling and uncoupling the same to and from each other, the clutch means being movable between coupled and uncoupled position and normally occupying its coupled position, and operating means responsive to the rotational speed of the engine and operatively associated with the clutch means for causing the same to occupy its uncoupled position when the rotational speed of the engine is below a predetermined rotational speed.

According to another feature of the present invention, the automatic clutch arrangement further includes second operating means responsive to the linear speed of the vehicle and operatively associated with the clutch means—if desired, by the intermediary of the first-mentioned operating means—for permitting the clutch means to occupy its coupled position when the linear speed of the vehicle is greater than a predetermined linear speed, irrespective of the rotational speed of the engine. As a result, the engine and the driving wheel are uncoupled from each other when the rotational speed of the engine is below the predetermined rotational speed and the linear speed of the vehicle is not gerater than the predetermined linear speed, whereas the engine and the driving wheel are coupled to each other when the linear speed of the vehicle is greater than the predetermined linear speed, irrespective of the rotational speed of the engine.

According to a preferred embodiment of the present invention, the clutch means is electric and is so constructed and arranged that when it is unenergized it occupies its coupled position and that when it is energized it occupies its uncoupled position. The first-mentioned operating means are clutch energizing means which energize the clutch when the rotational speed of the engine is below the predetermined rotational speed, and the second operating means are deactivating means which deactive the clutch energizing means when the linear speed of the vehicle is greater than the predetermined linear speed.

Figure 2:
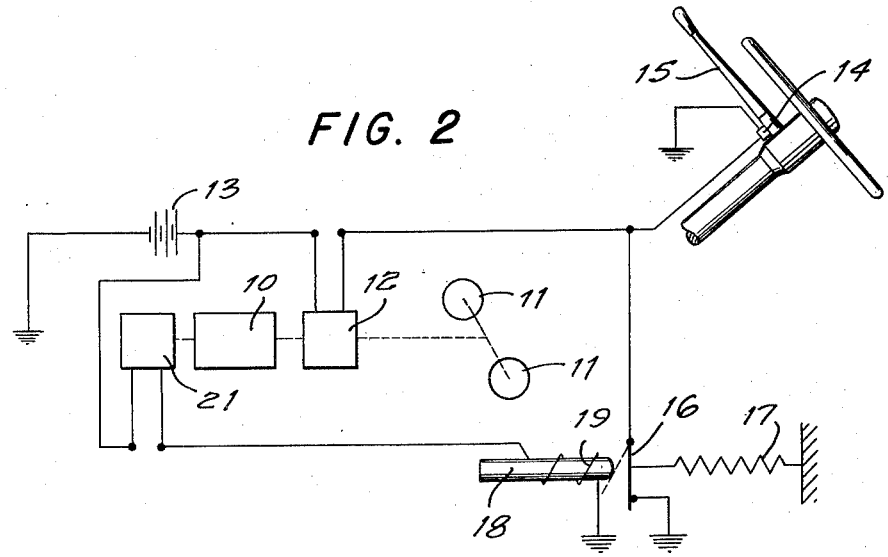

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figs. 1 and 2 are schematic diagrams of two embodiments of an automatic clutch arrangement according to the present invention wherein the clutch is automatically disengaged when the rotational speed of the engine is below a predetermined rotational speed; and Figs. 3 and 4 are schematic diagrams of two embodiments of an automatic clutch arrangement according to the present invention wherein the clutch is automatically disengaged when the rotational speed of the engine is below a predetermined rotational speed and the linear speed of the vehicle is not greater than a predetermined linear speed, but wherein the clutch is automatically engaged when the linear speed of the vehicle is greater than the predetermined linear speed, irrespective of the rotational speed of the engine.

Referring now to the drawings, and to Fig. 1 thereof in particular, there is shown a motor vehicle having engine 10 and a set of driving wheels 11. The engine and the driving wheels are mechanically connected to each other by means of a clutch 12 and, if desired, by a suitable multiple speed transmission (not shown). The clutch may be an electrically actuated fluid clutch which is continuously biased, by a spring or otherwise, into its coupled or engaged position, so that when the clutch is unenergized it occupies its coupled position, whereas when the clutch is electrically energized, it occupies its disengaged or uncoupled position. The clutch is connected in series with a battery 13 or other source of electric energy and a switch 14 which is operatively associated with the gear shift 15 in such a manner that when the latter is actuated so as to shift gears, the clutch is energized at the proper time to permit the smooth shifting of gears and is de-energized when the gear shifting operation is completed.

The electric circuit incorporating the clutch 12 and battery 13 may also be closed by means of a switch 16 which is continuously biased into its closed position, shown in solid lines, as, for example, by a spring 17. The switch 16 cooperates with a solenoid core 18, the latter together with the winding 19 forming a solenoid relay acting as a switch actuator for the switch 16. The winding 19 is serially connected to a generator 20 which is mechanically coupled to the engine 10 and is driven thereby during rotation thereof so that the output voltage of the generator is a function of the rotational speed of the engine. When the engine rotates at least at a certain speed, the output voltage of the generator is sufficiently great to energize the solenoid relay sufficiently to cause the same to move the switch 16 to its open position, shown in dotted lines, against the biasing force of the spring 17. Conversely, when the rotational speed of the engine is below this certain speed, the output voltage of the generator is insufficient to energize the solenoid relay sufficiently to cause the same to move or maintain the switch in its open position.

In practice, the arrangement of the parts is such that when the engine rotates at idling speed or slower, the solenoid is not energized. In this way, the switch 16 will occupy its closed position under the influence of the spring 17, thereby energizing the clutch 12 and causing the same to occupy its uncoupled position. In this way, the engine and driving wheels will be out of power-transmitting engagement with each other when the engine rotates at idling speed or less, whereas when the engine is accelerated, the output voltage of the generator is sufficient to energize the solenoid relay sufficiently to cause the same to open the switch 17, thereby de-energizing the clutch and permitting the same power-transmittingly to couple the engine and the driving wheels to each other.

The embodiment illustrated in Fig. 2 differs from the above-described one only in that the winding 19 instead of being serially connected to a generator driven by the engine, is in series with the battery 13 and a rotational speed responsive switch device 21. The latter is mechanically connected to the engine 10 and is so constructed and arranged that it assumes its closed position when the rotational speed of the engine is at least as great as a certain predetermined rotational speed.

In practice, the switch device 21 remains open so long as the engine rotates at idling speed or slower, whereas when the engine is accelerated, the switch assumes its closed position, the operation of the arrangement shown in Fig. 2 therefore being identical to the above-described one.

Fig. 3 shows an automatic clutch arrangement identical to that illustrated in Fig. 1 except that provision is made for automatically engaging the clutch 12 as soon as the vehicle begins to move, i. e., for coupling the engine and the driving wheels to each other whenever the vehicle moves at or attains a predetermined linear speed, this coupling action taking place irrespective of the rotational speed of the engine. Thus, the automatic clutch shown in Fig. 3 includes an arrangement whereby the energizing means which energize the clutch 12 when the rotational speed of the engine is relatively low are automatically deactivated when the linear speed of the vehicle is greater than a predetermined linear speed, which may be of the order of a few miles per hour.

The deactivating means include a circuit breaker incorporated in the series circuit containing the clutch 12, the battery 13 and the switch 16, for interrupting this circuit when the linear speed of vehicle exceeds the predetermined speed. The circuit breaker may include the solenoid core 18 and a second winding 22 which elements together form a switch actuator for actuating the switch 16 which is actuatable independently from the switch actuator constituted by the core 18 and the winding 19.

The winding 22 is serially connected to a solenoid energizing arrangement which includes the battery 13 and a switch device 23. The latter is responsive to the linear speed of the vehicle and may, if desired, be mechanically coupled to the drive shaft which serves to transmit the driving torque to the wheels 11, it being obvious that during normal operation of the vehicle the rotational speed of the drive shaft is directly proportional to the linear speed of the vehicle. The switch device 23 is a normally open one which assumes its closed position when the vehicle travels at or attains a certain linear speed, thus energizing the winding 22 and causing the switch 16 to assume its open position. This, in turn, will de-energize the clutch 12 so as to permit the latter to assume its coupled position under the influence of its biasing force.

It will be seen from the above that the engine and driving wheels are uncoupled from each other when the rotational speed of the engine is below a predetermined rotational speed and so long as the linear speed of the vehicle is not greater than a predetermined linear speed, whereas the engine and driving wheels are coupled to each other when the linear speed of the vehicle is greater than this predetermined linear speed, irrespective of the rotational speed of the engine. In other words, while the clutch interconnecting the engine and driving wheels is disengaged whenever the engine rotates below the predetermined rotational speed, this disengaging action will be over-ridden when the linear speed of the vehicle exceeds the predetermined linear speed. In practice, the predetermined rotational speed in question is a rotational speed somewhat higher than idling, and the linear speed in question is a relatively low speed and, as set forth above, may be of the order of a few miles per hour.

The embodiment shown in Fig. 4 is similar to the arrangement shown in Fig. 3 but differs therefrom in that the winding 19 instead of being connected to an engine-driven generator is energized by the battery 13, a serially connected rotational-speed responsive switch device 30 being provided to close the electric circuit when the rotational speed of the engine is sufficiently high. The switch device 30 is mechanically coupled to the engine 10 and includes a plurality of weights 31 which when the shaft 32 rotates at sufficiently high speed fly outwardly against the action of the spring 33 and cause the movable contact 34 to move rightwardly, as viewed in Fig. 4, and to engage the stationary contact 35, thereby closing the electric circuit incorporating the switch device 30, the battery 13 and the winding 19.

The embodiment shown in Fig. 4 further differs from that illustrated in Fig. 3 in that linear speed responsive means include a completely separate circuit breaker for opening the series circuit which includes the clutch 12, the battery 13 and the switch 16. The circuit breaker includes a switch 40 which is incorporated in this series circuit and is continuously biased to its closed position by a spring 41. The switch 40 is activated by a switch actuator which includes a solenoid relay composed of a solenoid core 42 and a winding 43, the latter being in series circuit with the battery 13 and a linear speed responsive switch device 44 which may be in the form of an indicating instrument capable of indicating the linear speed of the vehicle. The instrument has a dial 45 and a hand 46 which carry a stationary contact 47 and a cooperating movable contact 48, respectively. The contacts engage each other when the instrument indicates a speed at least as great as the desired predetermined linear speed, so that when this speed is attained or exceeded, the winding 43 is energized, thereby opening the switch 40. In this way, the clutch 12 is de-energized and is free to assume its coupled or engaged position under the influence of its own biasing force.

If desired, the solenoid relays 18, 19 and 42, 43 may instead of being associated with two serially connected switches 16 and 40, respectively, cooperate with a single switch and simply act as two independent switch actuators therefor.

It will be understood that each of the elements described above, or two or more together, may also find a useful application in other types of automatic clutch arrangements differing from the types described above.

While the invention has been illustrated and described as embodied in an automatic clutch arrangement adapted to be incorporated in a motor vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various application without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a motor vehicle having at least one driving wheel and an engine for driving the same, an automatic clutch arrangement, comprising in combination, electric clutch means interconnecting the engine and the driving wheel for power-transmittingly coupling and uncoupling the same to and from each other, said clutch means being so constructed and arranged that when it is unenergized it occupies its coupled position and that when it is energized it occupies its uncoupled position; clutch energizing means responsive to the rotational speed of the engine and operatively associated with said clutch means for energizing the same when the rotational speed of the engine is below a predetermined rotational speed, said clutch energizing means including a source of electric energy and switch means connected in series circuit with said clutch means, said switch means being continuously biased to closed position, and switch actuator means operatively associated with the engine for opening said switch means against the force continuously biasing said switch means to closed position when the rotational speed of the engine is at least as great as said predetermined speed so that when the rotational speed of the engine is below said predetermined speed, said switch actuator means permits said switch means to assume its closed position under the influence of its biasing force thereby energizing said clutch means; and deactivating means responsive to the linear speed of the vehicle and operatively associated with said clutch energizing means for deactivating the same when the linear speed of the vehicle is greater than a predetermined linear speed, said deactivating means including circuit breaker means responsive to the linear speed of the vehicle and incorporated in the series circuit containing said clutch means, said source of electric energy and said switch means for interrupting said circuit when the linear speed of the vehicle is greater than said predetermined linear speed, thereby de-energizing said clutch means so that the latter assumes its coupled position, whereby the engine and the driving wheel are uncoupled from each other when the rotational speed of the engine is below said predetermined rotational speed and the linear speed of the vehicle is not greater than said predetermined linear speed and whereby the engine and the driving wheel are coupled to each other when the linear speed of the vehicle is greater than said predetermined speed, irrespective of the rotational speed of the engine.

2. The combination defined in claim 1 wherein said circuit breaker means includes said switch means of said clutch energizing means and additional switch actuator means actuatable independently of the first-mentioned switch actuator means for opening said switch means against the force continuously biasing said switch means to closed position when the linear speed of the vehicle is at least as great as said predetermined linear speed.

3. The combination defined in claim 2 wherein said switch actuator means of said clutch energizing means and said switch actuator of said circuit breaker means include a common solenoid core, a pair of solenoid windings, and a pair of solenoid energizing means in series circuit with said pair of solenoid windings, respectively, one of said solenoid energizing means being responsive to the rotational speed of the engine for energizing the respective solenoid when the rotational speed of the engine is at least as great as said predetermined rotational speed and the other of said solenoid energizing means being responsive to the linear speed of the vehicle for energizing the respective solenoid when the linear speed of the vehicle is at least as great as said predetermined linear speed.

4. The combination defined in claim 2 wherein each of said switch actuator means includes a solenoid means and a solenoid energizing means in series circuit therewith, one of said solenoid energizing means being responsive to the rotational speed of the engine for energizing the respective solenoid when the rotational speed of the engine is at least as great as said predetermined rotational speed and the other of said solenoid energizing means being responsive to the linear speed of the vehicle for energizing the respective solenoid when the linear speed of the vehicle is at least as great as said predetermined linear speed.

5. The combination defined in claim 4 wherein the solenoid energizing means which is responsive to the linear speed of the vehicle include a source of electric energy and a switch device responsive to the linear speed of the vehicle connected in series circuit with said source of electric energy, said switch device including an indicating instrument capable of indicating the linear speed of the vehicle and having a dial and a hand movable relative thereto, said dial and said hand carrying cooperating contacts which engage each other when said instrument indicates a speed at least as great as said predetermined linear speed.

6. The combination defined in claim 5 wherein the solenoid energizing means which is responsive to the rotational speed of the engine include a source of electric energy and a centrifugal switch device connected in series circuit therewith, said switch device being mechanically connected to the engine and responsive to the rotational speed thereof and being so constructed and arranged as to assume its closed position when the rotational speed of the engine is at least as great as said predetermined rotational speed.

References Cited in the file of this patent
UNITED STATES PATENTS 1,868,910   Miller _____ July 26, 1932

FOREIGN PATENTS 238,018   Switzerland _____ Sept. 1, 1945
620,784   Great Britain _____ Mar. 30, 1949